United States Patent [19]
Benitez

[11] Patent Number: 5,907,711
[45] Date of Patent: May 25, 1999

[54] METHOD AND APPARATUS FOR TRANSFORMING MULTIPLICATIONS INTO PRODUCT TABLE LOOKUP REFERENCES

[75] Inventor: Manuel Enrique Benitez, Sunnyvale, Calif.

[73] Assignee: Hewlett-Packard Company, Palo Alto, Calif.

[21] Appl. No.: 08/589,213

[22] Filed: Jan. 22, 1996

[51] Int. Cl.$^6$ .................................................. G06F 9/302
[52] U.S. Cl. ............................................................ 395/709
[58] Field of Search .......................... 705/709; 395/588, 395/709, 701–705

[56] References Cited

U.S. PATENT DOCUMENTS

| | | | |
|---|---|---|---|
| 5,428,793 | 6/1995 | Odnert et al. | 395/709 |
| 5,539,907 | 7/1996 | Srivastava et al. | 395/705 |
| 5,655,122 | 8/1997 | Wu | 395/705 |
| 5,689,711 | 11/1997 | Bardasz | 395/701 |
| 5,696,971 | 12/1997 | Masih | 395/702 |

OTHER PUBLICATIONS

Pollack et al., "Incremental Global Optimization for Faster Recompilations", Dept. Of Computer Science, 1990.

Cann et al., "Sisal versus Fortran: A Comparison Using the Livermore Loops", Computing Research Group, L–306, Lawrence Livermore National Lab, IEEE.

Ancona et al., "Practical Optimizations of LR(k) Parsing Tables", IPCCC, IEEE 1992.

J. Ramanujam, "Non–unimodular Transformations of Nested Loops", Dept of Electrical and Computer Engineering, Louisiana University, Baton Rouge, LA 70803, 1992, IEEE.

Bernstein, Software—Practice and Experience, vol. 16(7), pp. 641–652 Jul. 1986, "Multiplication by Integer Constants".

*Primary Examiner*—Frantzy Poinvil

[57] ABSTRACT

A compiler automatically determines when it is advantageous to perform multiply operations by using a table of product values (that is, a table that contains scale_factor ×0 as its first entry, scale_factor ×1 as its second entry, scale_factor ×2 as its third, and so on) and transforms the multiply operations into a table lookup indexed by the value of the non-constant multiplier. This transformation is only performed when it is found to be advantageous to do so. Performing the transformation requires that the product table be initialized when the program actually runs, but that can be done at a location that is much less-frequently visited than the location where the multiply operation takes place.

29 Claims, 3 Drawing Sheets

METHOD AND APPARATUS FOR TRANSFORMING MULTIPLICATIONS INTO PRODUCT TABLE LOOKUP REFERENCES

BACKGROUND OF THE INVENTION

1. Technical Field

The invention relates to computers. More particularly, the invention relates to computer implemented integer operations.

2. Description of Prior Art

While most integer operations can be performed by a computer in a single processor cycle, such operations as multiplies usually require three or more cycles to finish. Thus, multiplying integer numbers is a relatively expensive operation to perform on modern computers.

On some computer architectures, no integer multiply operation is provided by the arithmetic-logic unit (ALU) and multiply operations must either be performed as a long sequence of shifts, adds, and subtracts (much like a person would perform long multiplication by hand); or by transferring the integer values to the floating-point unit (FPU) and performing the multiply operation there. Because of this, code improvement transformations that compilation systems can automatically perform to eliminate multiplies or reduce their cost are important.

A number of approaches have been described and implemented to reduce the cost of multiply operations. Perhaps the oldest and most-commonly implemented schemes are algebraic transformations that remove multiplies where one of the multipliers is known to be either zero (the product is then also zero) or one (the product is then the same value as the other multiplier). Equally ubiquitous are constant folding transformations that replace a multiply whose multipliers are both known constant values with a cheaper code sequence instantiating the appropriate product value.

Also well known are transformations that replace multiplications where one of the multipliers is a known power of 2 (e.g. 2, 4, 8, or 16) with a "left-shift" operation that shifts each bit of the unknown multiplier by the base 2 logarithm of the known multiplier value to yield the desired product. This simple observation can be combined with addition and subtraction to transform multiplies where one of the multipliers is a known constant value to a faster sequence of shift, add, and subtract instructions (see, for example R. Bernstein, *Multiplication by Integer Constants*, Software-Practice And Experience, Vol. 16(7), pp. 641–652 (1986)).

Finally, in cases where the values of both multipliers are unknown at the time that the source code is processed by the compilation system and a fast floating-point multiply operation is available on the target architecture, the integer multiply can be transformed into a code sequence that converts the integer multipliers to appropriate floating-point values, multiplies the floating-point values to produce a floating-point product, and then converts this value back to its integer representation.

It would be advantageous to provide a technique that increases the cases where a compilation system for a computer that performs relatively slow multiplication operations can improve the performance of the compiled code.

SUMMARY OF THE INVENTION

The invention described herein is based on the observation that, in some cases, a compilation system can determine that one of the multipliers in a multiplication remains constant across many consecutive visits. Thus, a compiler is disclosed that automatically determines when it is advantageous to perform multiply operations by using a table of product values (for example, a table that contains scale_factor×0 as it first entry, scale$_{\_factor}$×1 as its second entry, scale_factor×2 as its third, and so on). The compiler provides an optimizer that transforms the multiply operations into a table lookup indexed by the value of the non-constant multiplier. This transformation is only performed when it is found to be advantageous to do so. Performing the transformation requires that the product table be initialized when the program actually runs, but that can be done at a location that is much less-frequently visited than the location where the multiply operation takes place.

DETAILED DESCRIPTION OF THE INVENTION

Figure 1:
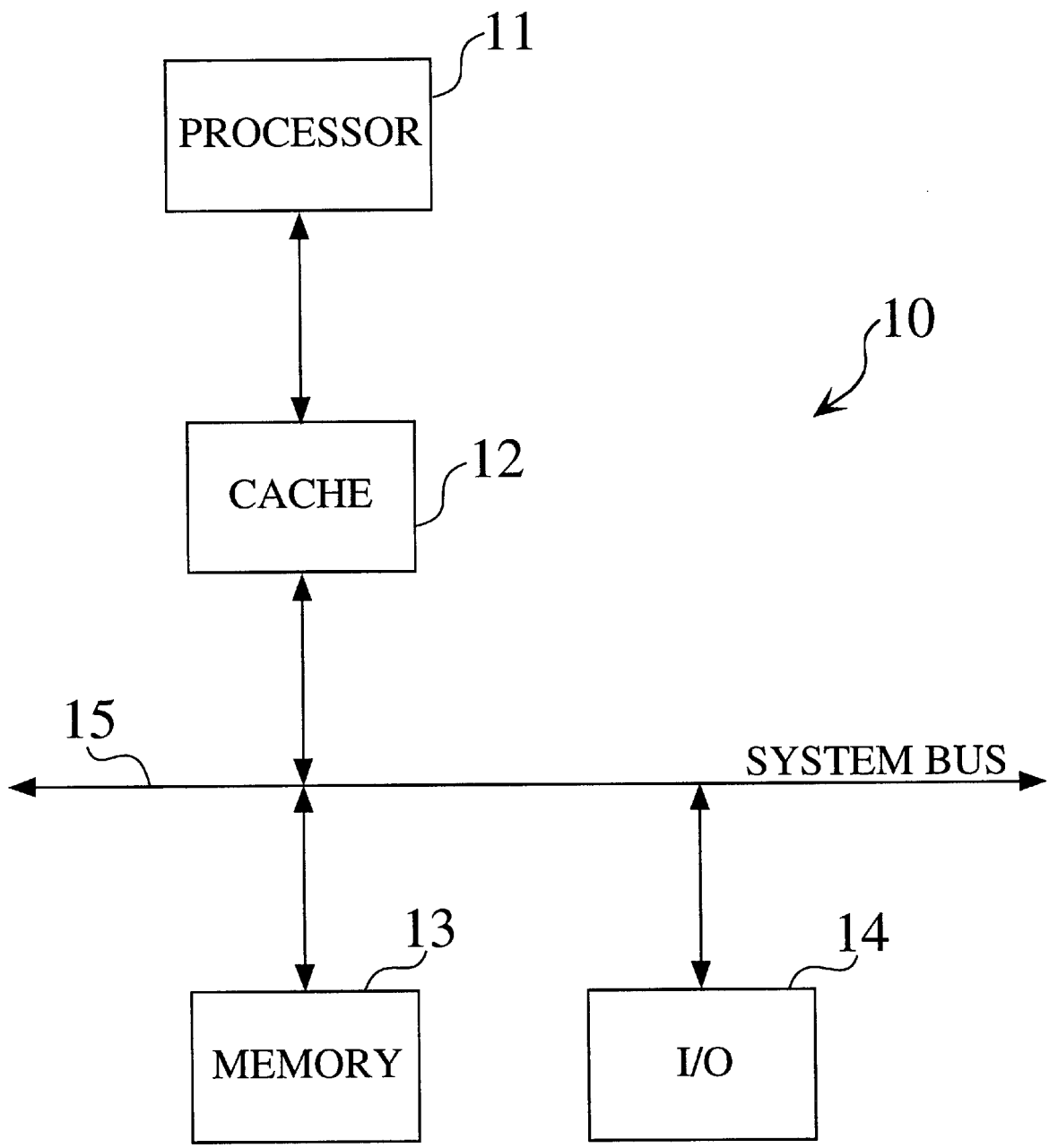
FIG. 1 is a block schematic diagram of a uniprocessor computer architecture.

The invention exploits to advantage the fact that there is a significant computational cost to performing an operation that is constantly multiplying by the same factor again and again. For example, in a smoothing algorithm of the type well known to those familiar with the JPEG standard for image data compression, pixel values are fairly small, ie. each pixel can have a value between 0 and 255. This value fits into 8 bits, providing $2_8$ different values. In a smoothing algorithm that examines eight different pixels, when these eight values are summed in accordance with the smoothing algorithm, the largest possible value is about 2000. Thus, the smoothing value is between 0 and 2000. Thus, such algorithm exemplifies that case where there are fairly small values and where expensive multiplication operations are performed by the same factor again and again.

In normal multiplication, multiplication operations can take up to about 80 processor cycles. The invention provides an optimizer that recognizes such repetitive multiplications during source code compilation and produces a table that is substituted for such frequently encountered multiplication operations. Such a table is fairly quick to build because each successive factor in the table is just a factor added to itself. Thus, the table starts with zero, and then the factor, and then the factor is added again to itself to get two times, and then the factor is added to itself again to get three, and so on. Thus, it is a very inexpensive operation to build such table. The table is preferably fairly small because a very large table may take up too much room in the cache memory, which is usually of a very limited size. Even though cache memories are getting quite large, it is still preferred that the table not get so large that it throws out other useful values in the cache.

Once the table is built, performing a multiply operation is simple task that involves taking the value that the multiplier value is limited to, i.e. the narrower value which is between 0 and 255, and then using that value as an index into the table. This can be done in a single index load operation if the value is in cache, which it is after the table is built. It's automatically put in cache. On a modern processor, this operation only takes 2 to 3 cycles to get that piece of information back. Thus, the invention replaces a computationally expensive multiply operation with a computationally inexpensive load operation.

If the factors required for various operations are going to be the same again and again, then rather than building the table immediately, the code is optimized to retain the table in a memory that persists from call to call. As new factors are encountered, the code (as a result of optimization as herein described) looks to see if the same factors were used the last time a table was built. If the answer is yes, it is not necessary to go to the trouble of building the table. It should be appreciated that the invention may be applied to any algorithm where multiply operations are performed again and again by the same kind of factors, where one of the multipliers tends to be fairly limited in its range of values.

Another advantage of the invention is that a programmer may code a program in a straightforward way, such that it is much easier for someone to come back to the program source code and understand how the code operates. Whereas, if the programmer tries to do something fancy by hand to eliminate multiply operations, the source code turns into something that is harder to understand.

However, when the compiler does such optimizations, a programmer does not see such changes to the code. As far as the programmer is concerned, the compiler exploits various traits and finds out where opportunities for optimization exist, and does the hard work for the programmer. So the programmer does not have to worry about where there is a performance bottleneck on a target computer architecture.

FIG. 1 is a black schematic diagram of a uniprocessor computer architecture 10 including a processor cache. In the figure, a processor 11 includes a cache 12 which is in communication with a system bus 15. A system memory 13 and one or more I/O devices 14 are also in communication with the system bus.

In a compile operation, a user submits a source code program to a compiler, which is a program that runs on the computer. The compiler accepts the source code, processes the code, and produces an executable file that is optimized for a target computer architecture, e.g. computer architecture 10.

Figure 2:
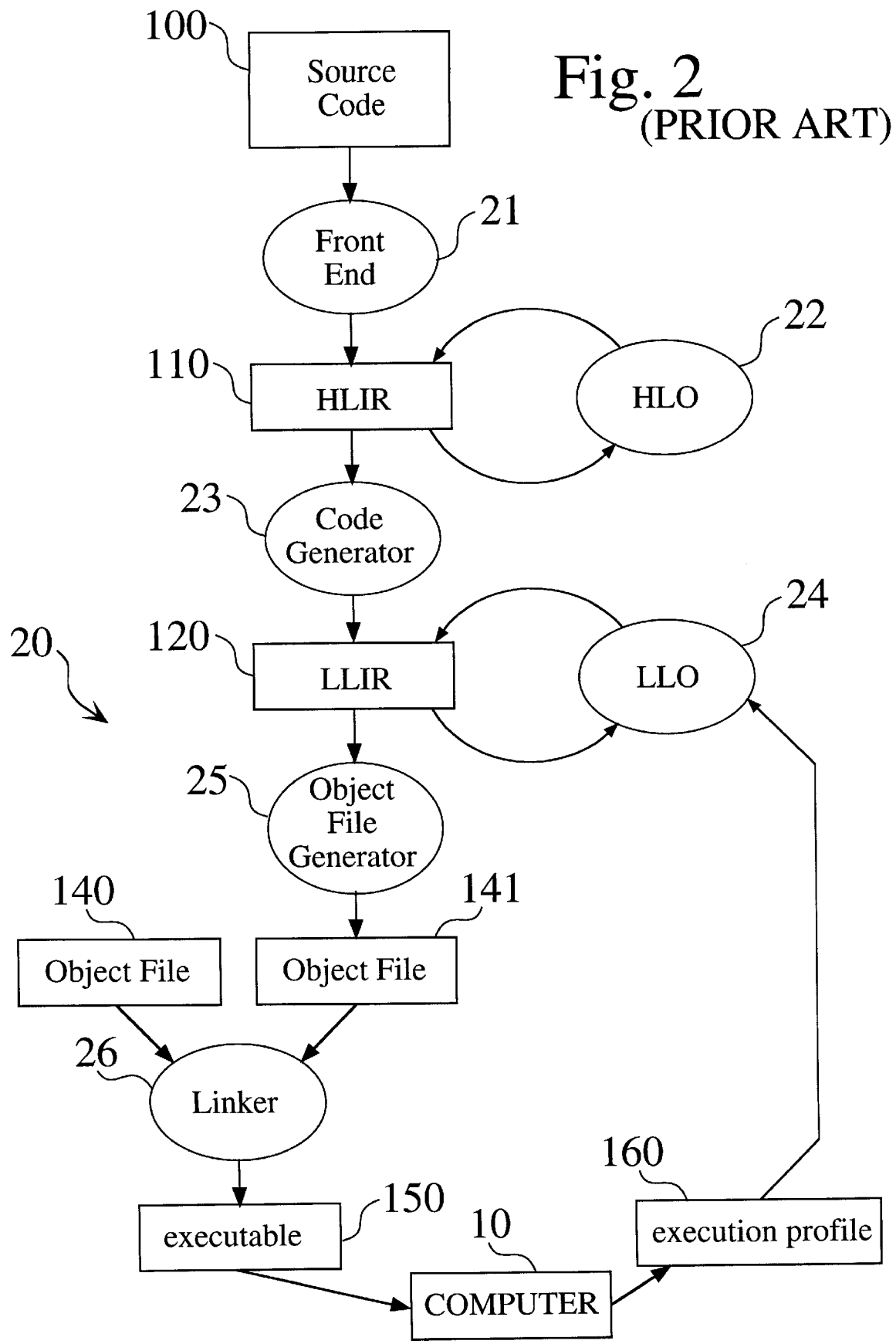
FIG. 2 is a block schematic diagram of a software compiler, for example as may be used in connection with the computer architecture shown in FIG. 1.

FIG. 2 is a block schematic diagram of a software compiler 20, for example as may be used in connection with the computer architecture 10 shown in FIG. 1. The compiler Front End component 21 reads a source code file (100) and translates it into a high level intermediate representation (110). A high level optimizer 22 optimizes the high level intermediate representation 110 into a more efficient form. A code generator 23 translates the optimized high level intermediate representation to a low level intermediate representation (120). The low level optimizer 24 converts the low level intermediate representation (120) into a more efficient (machine-executable) form. Finally, an object file generator 25 writes out the optimized low-level intermediate representation into an object files (141).

The object file (141) is processed along with other object files (140) by a linker 26 to produce an executable file (150), which can be run on the computer 10. In the invention described herein, it is assumed that the executable file (150) can be instrumented by the compiler (20) and linker (26) so that when it is run on the computer 10, an execution profile (160) may be generated, which can then be used by the low level optimizer 24 to better optimize the low-level intermediate representation (120). The compiler 20 is discussed in greater detail below.

The invention described herein is based on the observation that, in some cases, a compilation system can determine that one of the multipliers in a multiplication remains constant across many consecutive visits. An example of this is a program subroutine that applies a single scale factor to every element in a matrix. Such a subroutine might look like the following if it were coded in the C programming language:

```
void scale_matrix (int A[ROWS] [COLUMNS],
                   (int scale_factor)
{
    int l, j;
    for (l = 0; l < ROWS; l = l + 1)
        for (j = 0; j < COLUMNS; j = j + 1)
            A[l] [j] = A [l] [j] * scale_factor;
}
```

In this example, the value of scale_factor is not readily known, but a sophisticated compilation system can determine that it remains constant across ROWS×COLUMNS consecutive multiplications.

The invention finds such cases and determines when it is advantageous to perform the multiplications by using a table of product values (for example, a table that contains scale_factor×0 as its first entry, scale_factor×1 as its second entry, scale_factor×2 as its third, and so on) and transform the multiply into a table lookup indexed by the value of the non-constant multiplier. The invention then proceeds to perform this transformation when it is found to be advantageous. Doing so requires that the product table be initialized when the program actually runs, but that can be done at a location that is much less-frequently visited than the location where the multiplies takes place.

The invention alters the subroutine so that it behaves in manner shown by the following code:

```
void scale_matrix (int A[ROWS] [COLUMNS],
                   (int scale_factor)
{
    int l, j;
    int product_table [MAXINT + 1]
    int x, product;
    product = 0;
    for (x = 0; x <= MAXINT; x = x + 1) (
        product_table[x] = product
        product = product + scale_factor;
    )
    for (i = 0; i < ROWS; i = i + 1)
        for (j = 0; j < COLUMNS; j = j + 1)
            if (A[l] [j] >= 0)
                A[l] [j] = product_table [A[l] [j]];
            else
                A[l] [j] = –product_table [A[l] [j]];
}
```

Thus, the multiply operation, which normally requires a long sequence of operations that take anywhere up to 80 processor cycles to execute, can be turned into a simple three-instruction sequence that provides each product in as little as 1 to 3 processor cycles, depending on the microarchitecture.

There are two associated issues that the invention considers and are essential to its effectiveness. The first is that there is no need to re-initialize the product table every time that the subroutine is invoked, provided that it is allocated so that it persists across multiple invocations of the subroutine and the value passed in the scale_actor argument is the same value that was last used to initialize the product table.

A simple check can be added to the initialization code to bypass the initialization loop if the value in product_table [1] is equal to scale_factor. This technique is called memorization, and it is a well-known technique that is used to improve the effectiveness of the invention.

A second issue is the amount of time and space required to initialize and hold a product table. In the above example, it is assumed that MAXINT (the largest value that fits into a signed integer variable) is less than ROWS×COLUMNS. On 16-bit architectures, this may be rather likely, on 32-bit and 64-bit machines, however, this is extremely unlikely and the amount of space required to hold such a table would be prohibitively large if it were. There are two different solutions to this problem, both of which are incorporated into the invention.

The first is to try to examine each multiplier to determine if the range of values that one of them can take on is substantially smaller than the full range of representable values. This is trivially the case when the type of a multiplier is short or char. To increase the likelihood of finding such opportunities, the current implementation of the invention carefully and deliberately tracks variables and the effect that each operation can have on the range of values that they can hold.

The second solution that the current implementation of the invention uses is to split a large range of values into two or more components and then individually access the product value associated with each component and assemble them back together. To better describe how this applies to the previous example, this example, which is semantically equivalent to the previous example, illustrates the use of this technique:

```
void scale_matrix (int A[ROWS] [COLUMNS],
                   (int scale_factor)
{
  int l, j;
  int product_table [(MAXINT + 1) / 65536];
  int x, product, low_part, high_part, multiplier;
  product = 0;
  if (product_table [1] != scale_factor) {
    for (x = 0; x <= MAXINT / 65536; x = x + 1) {
      product_table[x] = product;
      product = product + scale_factor;
    }
  }
  for (i = 0; i < ROWS; i = i + 1)
    for (j = 0; j < COLUMNS; j = j + 1) {
      if (A[l] [j]) >= 0)
```

Although it appears that this code contains more multiplies, these are all by a constant power of 2 (65,536 is 2 to the 16th power) and a binary computer can perform these operations using very inexpensive shift operations. Thus, the size of the product table needed is only one 65,536th the size of the product table used in the first example.

In operation, the compiler tells the program to reserve room for the table. The table itself cannot be built until the scale factors and multipliers are known. Thus, the compiler inserts code into the program that builds the table at run time. Thus, the invention provides a tool that is built into the low level optimizer of the compiler and that avoids repetitive multiplications by adding code to the run time program that causes the program to compute a table and reserve space in memory for this table. The invention optimizes the code to avoid expensive multiplications by using inexpensive memory lookups, e.g. cache lookups. Thus, the optimizer looks for and finds the opportunity to apply this particular transformation to the code that is being optimized and then substitutes code that performs the transformation.

Figure 3:
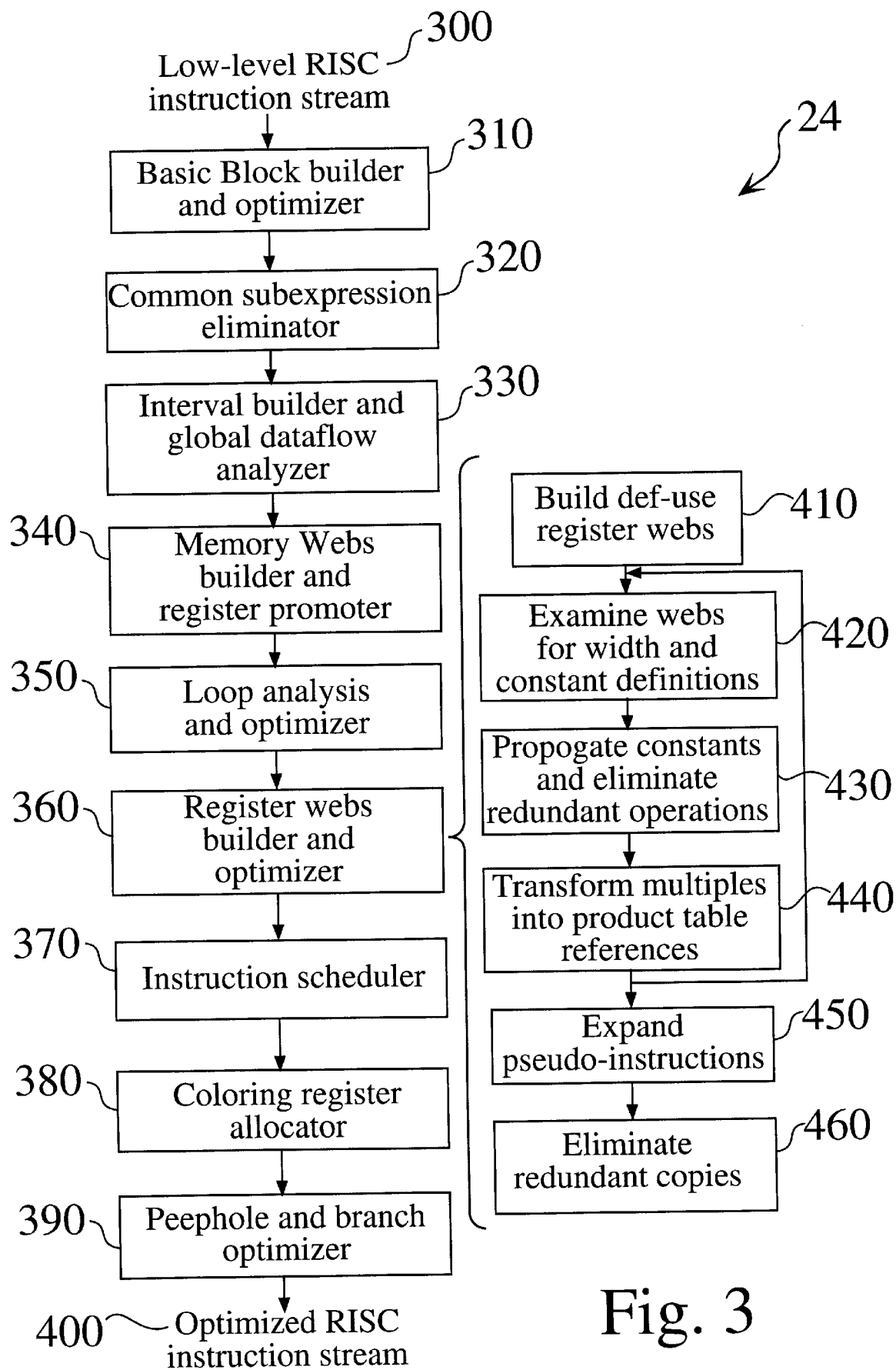
FIG. 3 is a block diagram of a compilation system that can determine that one of the multipliers in a multiplication remain constant across many consecutive visits according to the invention.

FIG. 3 is a high level, block diagram that shows the operations performed in the low level optimizer. In the preferred embodiment of the invention, the low level optimizer 24 receives a low level RISC code (300), i.e. code that is almost in a condition to be executed by a RISC processor-based machine. The optimizer takes the code and generates ancillary data structures that help the optimizer understand the code. The optimizer then starts transforming/modifying the code such that a final optimized risk instruction stream (400) is produced that runs significantly faster on the target computer architecture, e.g. a specific RISC-based architecture in the preferred embodiment of the invention.

The RISC compiler discussed herein is implemented with a machine-specific optimizer that understands the nuances of a particular RISC architecture (in the preferred embodiment of the invention, the PA-RISC architecture, which is owned by Hewlett-Packard Company of Palo Alto, Calif.). While the invention is described in connection with a low level optimizer, it should be appreciated that the invention is also readily applicable as a preprocessor, which looks at source code at the source code level, i.e. a high level optimizer. However, it is generally preferred to implement the invention in a low level optimizer because such application is limited to a particular code sequence for a machine-specific optimizer that knows a lot about the particular target machine. Thus, the low level optimizer is more likely to know when it is beneficial to apply the transformation taught herein and when it is not beneficial to do so.

Once the low level optimizer 24 receives the original low-level risk instruction stream (300), the code sequences are considered to be naive, i.e. they are not very smart about the operations that they are performing, such that they take a significant amount of time and energy to perform the function that they are intended to perform. The first step that is typically performed by the low level optimizer is to split the instruction stream up into basic blocks (310), i.e. into sequences of code where there is only an exit at the end of such sequence with no way to enter the code except at the beginning of the sequence. Thus, the code is encapsulated to allow a better understanding of the code to be obtained.

The optimizer then performs various optimizations upon these basic blocks. For example, the optimizer examines instruction sequences that are redundant, e.g. where three or four instructions are used, and where it is possible to use just one instruction (320). This is type of pattern matching is referred to as common sub-expression elimination.

Next, the optimizer performs an operation that is referred to as interval building (330), in which the basic block structure is examined to decipher the code structure in terms of higher level structures. For example, the optimizer tries to find such structures as, for example, loops and if/then statements. This operation also helps to perform data flow analysis, which determines for the code being optimized where values are generated, where values are consumed, and how long values persist.

The optimizer next builds memory webs (340) that examine memory references. Thus, if there is a particular local or global variable that leaves a memory reference, it is often desirable to take, for example, such local variable and promote it to a register (i.e. perform register promotion), which keeps the variable in a register as opposed to having to perform a computationally expensive reference to memory for such variable. Accordingly, the optimizer builds webs, which are data structures that identify where variables are defined and where such variables are used.

Next, the optimizer performs loop analysis (350) by going individually to each loop to determine what that loop is doing. Loops are important in optimizations because most programs spend most of their time inside of loops. Because of that, most optimizers traditionally focus on loops to try to speed up the loops.

In fact, the transformation taught herein in connection with the preferred embodiment of the invention typically operates under the assumption that the program is in a loop, where the program is trying to perform a particular operation again and again within the confines of the loop. In a sense, the transformation may be a part of the loop analysis phase, although it is not necessary that the optimizer see the loop structure. Rather, it is only necessary to know where variables are set and defined and the particular cost of performing an operation at one point versus another point. For example, it is desirable to build a table at a point where it is less computationally expensive to perform various operations than to perform an outright multiply. Thus, if an operation resides inside a loop, it is typically considered to be a more expensive operation.

Traditionally, finding loops is accomplished by looking at the structure of the program. The optimizer herein disclosed actually has the ability to go in and build the program, allow the user to run the program, and as the program runs, the optimizer determines where the program is spending its time while running, e.g. which instructions are executed more often than others. The optimizer herein disclosed then feeds that information back in, such the program may be recompiled with more accurate information about where the program is really spending its time and which instructions are going to be more computationally expensive relative to others.

By using this kind of feedback information, the optimizer herein disclosed can actually make wiser decisions about which particular multiply operations to transform and which multiply operations to ignore because they are not executed very often. In particular, although a segment of the program may look like a loop, it does not mean that program segment is going to be executed many times. It may only be executed once or even not at all. Thus, there is a risk of going after a loop and then later finding out at run time that the loop is not executed. A lot of resources may have been applied trying to optimize the loop, without any beneficial for such expenditure. This is one reason why the herein disclosed feedback scheme can enable the optimizer to generate much better code.

A register webs builder (350) builds what are referred to as def-use chains (410) that identify every point at which a particular register is defined and used over the register's lifetime. FIG. 3 shows a register webs component of the compiler broken out into its subcomponents. The transformation herein disclosed preferably operates as a subcomponent of the register webs and optimizer phase (360) of the optimizer 24.

First, the optimizer builds the def-use webs (410) for all the registers that are used in the program. The webs are then examined (420) to find those instances where a particular web has a limited set of values with which it can be associated. For example, if the program is loading out of a particular type of register that can only hold a character, for example where a character can only have a value between 0 and 255, which is fairly small relative to a word, then the optimizer knows and remembers that the character has this given set of values. When two characters are subsequently added together, it is known that the result can have a value between 0 and 510. The def-use register web thus provides a database/structure that allows ready propagation of this information to thereby expose the information to the rest of the optimizer.

The optimizer also propagates constants and eliminates redundant operations (430). For example, if a particular web can only have a constant value in it, then everywhere the web is defined it is given the same constant. The optimizer can go to all of the points where that web is used and replace that constant at that point, and thereby come up with better code.

The optimizer also eliminates redundant operations. For example, if a particular web has a value that can only be between 0 and 255, and a compare operation is performed on the web against another web that produces a value greater than 255, the optimizer knows that this is a useless operation because the web can never get a condition where it's values are greater than 255. So, the optimizer eliminates operations that are known to have no effect on an actual web.

The optimizer then finds places in the code where a multiply operation is to be performed (440). The optimizer identifies a multiply operation, for example by identifying two source webs—web 1 and web 2. The optimizer looking for a web that is limited in range and that is producing some result. The optimizer then goes back and looks at the other web to see if this other web potentially has several different values. That is, is the other web much wider, i.e. can it hold values that are much greater than the first web over a much wider range.

The optimizer then identifies locations in the code where this particular web might be defined. At this particular instruction, the optimizer can determine about how many times the instruction is going to be executed. This information is part of the loop analysis and the feedback obtained from running the code.

The optimizer then knows about how often this particular instruction is going to be executed. For example, if the optimizer expects this instruction to be executed a million times, then the optimizer goes back to find where this web is actually defined. For example, if the web is only defined at one place and this place is only executed ten times, then the optimizer determines that there is a potential benefit to performing the transformation described above because, if the optimizer were to insert code into the program at this point to build a table that would only get executed ten times, the transformation would actually speed up a million multiply operations by performing only a few steps during the optimization process.

An important consideration implementing the invention is the notion of cost analysis and benefit, i.e. "Would it be profitable to perform this transformation at this point" The optimizer determines where to assert the transformation by looking at locations where operations are defined within the webs and trying to determine how many times the code is to perform a multiply operation versus whether a product table is going to be inserted in a place that is less frequently visited than the actual number of multiply operations eliminated by the transformation.

The optimizer also bases its decisions on knowing the size of the table, where a larger table requires more time to build. Thus, once the optimizer performs the transformations, it may go back and reexamine the webs and determine, for example if there are now constants exposed that were not exposed before and if more is known about widths than could be determined before. So there's a certain amount of iteration that goes on until you come to the point where you realize that you had nothing new to do.

After the optimizer has determined the best possible code optimizations, the optimizer stops iterating and expands pseudo-instructions (450). For example, a multiply operation is a pseudo-instruction because it is not possible to take the code when such instruction is encountered and run it directly. For example, the integer multiply operation is not supported by the target machine. Such operation is put into the code as part of the instruction stream. When the optimizer gets to the point where there is nothing else it can do to this multiply, then the system is committed to performing this multiply operation. The optimizer then tries to determine whether it is necessary to perform such operation by calling a function that performs the multiply operation. If one of the values to be multiplied is a constant, then it is possible to find a better way of performing that multiply operation.

Finally, the optimizer looks for copies and eliminates redundant copies (460) which tend to show up as a result of performing a transformation, such as that described herein. Thus, rather than devoting two registers to hold the same value, the optimizer stores only one instance of the value.

The compiler then performs instruction scheduling (370), which reorders the instructions to eliminate some of the problems related to latency, i.e. where the program tries to use a value before it is produced.

Next, the compiler performs a coloring register allocation (380). Up to this point, the optimizer operated upon pseudo-registers but the registers are now real registers. This approach is taken because it is possible to use an unlimited number of pseudo-registers during optimization, and then at the end of the optimization process this unlimited number of registers is mapped to a very limited set of registers available in the target machine.

The last operation performed by the optimizer is that of peephole and branch optimization (390). Peephole optimizations apply simple, well known transformations that look for sequences of three or four instructions which can be replaced with just one instruction. Branch optimizations look for places, for example, where there is a branch to another branch which branches again. Rather than going through that middle step, the optimization goes directly to the last point.

An optimized instruction stream which, in this example, is a RISC instruction stream, is then output by the optimizer (400).

One advantage of the invention is that it increases the cases where a compilation system for a computer that performs relatively slow multiplication operations can dramatically improve the performance of the code. From the examples above, it is possible for a skilled programmer to rewrite the source code to take advantage of these opportunities. Even if a programmer understands the mechanics of this algorithmic transformation, they may either not consider it worth their time to implement, may do so and have a difficult time getting it right, are not willing to be obfuscated by the application of this technique, or may not know enough about the micro-architecture to determine if it is profitable to do so.

By allowing a compilation system to perform this transformation automatically through the use of this invention, programmers can focus their attention on other issues, less-experienced programmers are able to obtain higher performance from their systems, the final source code is easier to understand, and the most effective product table size and multiplier split components are automatically selected by the compilation system for the specific micro-architecture for which the compilation system is asked to produce code.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

I claim:

1. An apparatus for optimizing code in a compiler implemented in a programmable machine and operable to produce an optimized instruction stream from an instruction stream, comprising:

means for automatically determining during compilation when it is advantageous to perform at least one multiply operation as a table look-up;

means for transforming multiply operations into a table of product values, wherein said table is indexed by a value of a non-constant multiplier;

means for replacing said multiply operation with said table of product values; and means for performing loop analysis by looking at said code structure, building a program, allowing a user to run said program, and as said program is run, determining which program instructions are executed more often than others; said loop analysis means feeding information generated by running said program back in, such said program may be recompiled with more accurate information about which of said program instructions are more computationally expensive.

2. The apparatus of claim 1, further comprising:

means for determining which particular multiply operations to transform and which multiply operations to ignore because they are not executed very often.

3. The apparatus of claim 1, further comprising:

a register webs builder for building def-use webs for all the registers that are used in said program to identify every point at which a particular register is defined and used over said register's lifetime.

4. The apparatus of claim 3, further comprising:

means for examining said def-use webs to find instances where a particular web has a limited set of values with which it can be associated, and for providing a database/structure that allows ready propagation of such instances to said optimizer.

5. The apparatus of claim 3, further comprising:

means for propagating constants and eliminating redundant operations.

6. The apparatus of claim 3, further comprising:

means for finding places in said program where a multiply operation is to be performed.

7. The apparatus of claim 6, said finding means further comprising:

means for identifying a multiply operation by identifying two source webs, where a first of said webs is limited in range, and where a second of said webs holds values that are much greater than said first web over a much wider range.

8. The apparatus of claim 7, said finding means further comprising:

means for identifying locations in said program where a particular web is defined, determining how many times an instruction is executed, and determining if there is a benefit to performing a multiply operation transformation for such instruction.

9. The apparatus of claim 3, further comprising:
means for reexamining said webs.

10. The apparatus of claim 3, further comprising:
means for expanding pseudo-instructions.

11. The apparatus of claim 3, further comprising:
means for eliminating redundant copies that are produced as a result of performing a multiply operations transformation.

12. A compilation system implemented in a programmable machine and that can determine that one of the multipliers in a multiplication remains constant across many consecutive visits, comprising:
means for determining when it is advantageous to perform a multiplication operation by using a table of product values; and
means for transforming said multiply operation into a table lookup indexed by a value of a non-constant multiplier;
wherein it is not necessary to re-initialize said product table every time that a transformed multiply operation is invoked because said product table is allocated so that it persists across multiple invocations of said transformed multiply operation.

13. The compilation system of claim 12, wherein said product table may be initialized when a program produced by such compilation system is run by a target processor at a location that is much less-frequently visited than a location where multiply operations take place.

14. The compilation system of claim 12, wherein a large range of values is split into two or more components, a product value associated with each component is individually accessed, and said two or more components are assembled back together.

15. A method for optimizing code in a compiler implemented in a programmable machine and operable to produce an optimized instruction stream from an instruction stream, comprising the steps of:
automatically determining during compilation when it is advantageous to perform at least one multiply operation as a table look-up;
transforming multiply operations into a table of product values, wherein said table is indexed by a value of a non-constant multiplier;
replacing said multiply operation with said table of product values;
performing loop analysis by looking at said code structure;
building a program;
allowing a user to run said program;
and as said program is run, determining which program instructions are executed more often than others; and
feeding information generated by running, said program back in, such said program may be recompiled with more accurate information about which of said program instructions are more computationally expensive.

16. The method of claim 15, further comprising the step of:
determining which particular multiply operations to transform and which multiply operations to ignore because they are not executed very often.

17. The method of claim 15, further comprising the step of:

building def-use webs for all the registers that are used in said program to identify every point at which a particular register is defined and used over said register's lifetime.

18. The method of claim 17, further comprising the steps of:
examining said def-use webs to find instances where a particular web has a limited set of values with which it can be associated; and
providing a database/structure that allows ready propagation of such instances to said optimizer.

19. The method of claim 17, further comprising the step of:
propagating constants and eliminating redundant operations.

20. The method of claim 19, further comprising the step of:
finding places in said program where a multiply operation is to be performed.

21. The method of claim 20, further comprising the steps of:
identifying locations in said program where a particular web is defined;
determining how many times an instruction is executed; and
determining if there is a benefit to performing a multiply operation transformation for such instruction.

22. The method of claim 19, further comprising the step of:
identifying a multiply operation by identifying two source webs, where a first of said webs is limited in range, and where a second of said webs holds values that are much greater than said first web over a much wider range.

23. The method of claim 17, further comprising the step of:
reexamining said webs.

24. The method of claim 17, further comprising the step of:
expanding pseudo-instructions.

25. The method of claim 17, further comprising the step of:
eliminating redundant copies that are produced as a result of performing a multiply operations transformation.

26. A compilation method that can determine that one of the multipliers in a multiplication operation remains constant across many consecutive visits, comprising the steps of:
determining when it is advantageous to perform a multiplication operation by using a table of product values; and
transforming said multiply operation into a table lookup indexed by a value of a non-constant multiplier; and
allocating said product table so that it persists across multiple invocations of said transformed multiply operation, wherein it is not necessary to re-initialize said product table every time that a transformed multiply operation is invoked.

27. The compilation method of claim 26, further comprising the step of:
initializing said product table when a program produced by such compilation system is run by a target processor at a location that is much less-frequently visited than a location where multiply operations take place.

28. The compilation method of claim 26, further comprising the steps of:

splitting a large range of values into two or more components;

individually accessing a product value associated with each component; and assembling said two or more components back together.

29. The compilation method of claim 26, further comprising the step of: inserting code into a program to cause said program build said table at run time.

* * * * *